United States Patent [19]

Jasovsky et al.

[11] 3,821,447
[45] June 28, 1974

[54] METHOD FOR PRODUCING STABILIZED COFFEE AROMAS

[75] Inventors: George A. Jasovsky, Bayonne, N.J.; Wilfred L. Rappaneau, Dobbs Ferry, N.Y.; Gaetano J. De Ceglie, Palisades Park; Anthony T. Nacci, Bergenfield, both of N.J.

[73] Assignee: General Foods Corporation, White Plains, N.Y.

[22] Filed: May 12, 1972

[21] Appl. No.: 252,883

[52] U.S. Cl. .............................................. 426/386
[51] Int. Cl. .............................................. A23f 1/08
[58] Field of Search ....... 99/65, 71, 140 R; 426/386

[56] References Cited
UNITED STATES PATENTS

| | | | |
|---|---|---|---|
| 2,947,634 | 8/1960 | Feldman et al. | 99/71 |
| 3,244,533 | 4/1966 | Clinton et al. | 99/71 |
| 3,261,689 | 7/1966 | Ponzoni | 99/71 |
| 3,373,042 | 3/1968 | Elerath et al. | 99/71 |
| 3,421,901 | 1/1969 | Mahlmann et al. | 99/71 |
| 3,554,761 | 1/1971 | Carbonell | 99/71 |
| 3,615,665 | 10/1971 | White et al. | 99/71 |

*Primary Examiner*—Frank W. Lutter
*Assistant Examiner*—William L. Mentlik
*Attorney, Agent, or Firm*—Thomas R. Savoie; Daniel J. Donovan; Bruno P. Struzzi

[57] ABSTRACT

Coffee aromas such as grinder gas are collected during the processing of coffee beans and are absorbed on or are condensed and added to an edible glyceride, such as an oil. This blend is processed to remove excess water and is then mixed with an aqueous solution (e.g., coffee extract) or dry soluble coffee. The aromatized glyceride may be frozen and ground into particulate matter prior to being mixed with the solution or soluble coffee.

4 Claims, No Drawings

METHOD FOR PRODUCING STABILIZED COFFEE AROMAS

BACKGROUND OF THE INVENTION

Many prior art coffee aromas have been proposed for the aromatization of soluble coffee. Among these aromas are the gases obtained during the roasting of green coffee as described by Wendt in U.S. Pat. No. 2,156,212, the gases obtained during the grinding of roasted coffee as described by Clinton et al. in U.S. Pat. No. 3,021,218, the steamdistilled volatile aromas from roasted and ground coffee as described in U.S. Pat. Nos. 2,562,206 to Nutting, 3,132,947 to Mahlmann, 3,244,521 to Clinton et al., 3,421,901 to Mahlmann et al., 3,532,507 to Cascione and 3,615,665 to White et al., and the vacuum-distilled aromas from roasted and ground coffee as described in U.S. Pat. Nos. 2,680,687 to Lemonnier and 3,035,922 to Mook et al.

These aromas, while generally possessing a desirable and pleasant aroma immediately after isolation, degrade even when held at low temperatures in an inert atmosphere. Previous attempt to fix coffee aromas by merely adding a condensed aroma to an edible oil as described in U.S. Pat. No. 3,035,922 to Mook et al. has not proven entirely successful. The instability of these aromas is one major factor retarding the use of coffee aromas in soluble coffee products. It would therefore, be highly desirable to have a method of fixing these coffee aromas sufficiently well to permit the fixed aroma to be added to a liquid coffee extract or a dry soluble coffee, without the development of off-aromas.

SUMMARY OF THE INVENTION

It has been found that coffee aromas, such as those enumerated above, can be stabilized if they are dissolved in an edible glyceride and processed in order to reduce the water content of the aromatized oil to a level of about 0.5 percent by weight or less. The aromas may be condensed and then added to the glyceride or absorbed directly by the glyceride. Centrifugation, ultracentrifugation, molecular fractionation, drying agents and like methods have proven to be successful techniques for removing substantially all of the water from the aromatized glyceride.

This "dry" aromatized glyceride may then be either combined with dry soluble coffee such as by atomization techniques, or added to a liquid extract, such as coffee extract, prior to drying the extract. The aromatized glyceride may be solidified, such as by freezing, and comminuted, such as by grinding, prior to being mixed with the solution or soluble coffee. By keeping the aromatized glyceride frozen the aromas' contact with and interaction with water is further reduced.

Coffee aromas fixed in a "dry" glyceride according to the process of this invention have proven to possess relatively high stability and are an acceptable means for aromatizing soluble coffee products, such as those which are conventionally packaged under an inert atmosphere.

DESCRIPTION OF THE INVENTION

This invention will be described primarily in terms of its application to grinder gas; however, as previously mentioned, the process of this invention is equally applicable to other coffee aromas, such as the steam-distilled and vacuum-distilled aromas recited above, either alone or in combination.

Grinder gas possesses a very pleasing aroma somewhat akin to the aroma sensation experienced in opening a can of roasted and ground coffee. Grinder gas is released during grinding of roasted coffee beans and also continues to evolve from the fractured beans for a period after grinding. The chemical composition of this gas is largely carbon dioxide together with water vapor and the characteristic aromatic constituents of roasted coffee. The amount of water in the gas may be lowered by use of low moisture green beans, dry roasting conditions and dry quenching mediums.

Grinder gas can be collected during the grinding operation by enclosing or hooding the grinding equipment. The gases liberated from the ground coffee may be removed by a rotary blower; additionally, when desired, a stream of inert, preferably moisture free, gas such as nitrogen may be used to sweep the gas from the coffee so that the grinding operation takes place in a substantially inert atmosphere. Such a process is described in U.S. Pat. No. 2,156,212 which describes a method of collecting gases evolved during roasting, but which can be equally applied to the collection of grinder gases. The previously enumerated patents disclose methods for collecting other coffee aromas.

The collected aromas and/or gases may be condensed at low temperatures. It is possible to condense the entire material at a temperature on the order of $-196°C$ or less, but to do so is wasteful of such expensive refrigerants as liquid nitrogen. It may be preferable to carry out the condensation in a number of stages. For example condensation of the aroma components present in grinder gas may be obtained in a three stage condensation procedure, the first stage being cooled with a brine to a temperature between $0°C$ and $-15°C$ in order to condense water vapor, the second stage being cooled below $-80°C$ to condense carbon dioxide, while the third stage condenser is maintained at a temperature of $-196°C$ (B.P. of liquid nitrogen) to condense the more volatile, and usually more desirable, aromatics. Condensation may also proceed in two stages, the first stage being maintained at a temperature below $-80°C$ while the second stage is maintained at a temperature corresponding to that yielded by liquid nitrogen.

The aroma bearing condensate, which may be in the form of a frost, is contacted with a glyceride substance (e.g., triacetin, an oil, a low melting point fat, etc.) Alternatively the gaseous aromas may be adsorbed directly by the glyceride substance.

Coffee oil as well as cotton-seed oil, coconut oil and triacetin have proven especially useful in the process of this invention. The glyceride substance acts as an aroma carrier or fixative enabling the aroma to be added to either an aqueous solution containing dissolved solids or to a soluble coffee powder. Physical contact between the aroma and the glyceride material can occur by any conventional technique such as by merely mixing in a closed vessel or by means of packed adsorption columns.

The aromatized glyceride material is processed in order to reduce its moisture level to below 1.0 percent by weight and preferably below about 0.5 percent. Water is removed from the aromatized glyceride material by means of physical separation techniques such as centrifugation, ultracentrifugation, molecular filtration, drying agents, glass wool packed columns, etc. Naturally these techniques may be used either alone or in combination.

This step of water removal has been found necessary in order to stabilize the aroma so that it will retain its fragrance, balance and freedom from staleness for relatively long hold-up times of up to 24 hours which may occur during processing. It has been found that if the water content of the aromatized glyceride is not reduced to at least the above-mentioned levels, noticeable changes in aroma and/or appearance will occur in the aromatized oil even under conditions of low temperature storage. Grinder gas added to oil carriers without the subsequent removal of excess water has been found to rapidly develop an undesirable peanutty aroma.

It has been conjectured that removal of water acts either to remove the medium which facilitates interaction between the various volatile compounds or else to remove certain unstable compounds which have a greater affinity for water than for glycerides. In any event, after being fixed in the "dry" glyceride the aroma is stabilized to such an extent that it may be added to an aqueous medium such as coffee extract.

The aromatized glyceride material having a reduced moisture content may be combined with soluble coffee such as by atomizing or spraying directly onto the coffee particles. Alternatively the "dry" aromatized glyceride material may be added to a solids-containing solution and subsequently dried. Coffee extract will be the usual liquid solution, however, other solutions, such as solutions containing water-soluble dextrins may also be employed.

When the "dry" aromatized glyceride material is to be added to a solution it may be found desirable to proceed in accordance with a technique disclosed in commonly-assigned, concurrently filed U.S. Pat. application, Ser. No. 252,778, entitled "Enhanced Soluble Foodstuffs and Method for Producing Same," which is hereby incorporated by reference. According to this technique the aromatized glyceride material is solidified, such as by freezing, and then is comminuted, such as by grinding, prior to being added to the solution. Preferably the solution is in the form of a slush since this will both reduce the contact between the aroma and water and will also minimize melting of the frozen aromatized material. The aromatized liquid is converted into a dry material by conventional drying techniques such as by freezing and then freeze drying.

It has also been found possible to blend the comminuted particles of frozen aromatized glyceride with dry soluble coffee, where the aromatized glyceride melts and coats the coffee particles. In this manner valuable aromatics are not lost due to atomization.

This invention is further illustrated but not limited by the following examples:

EXAMPLE 1

Grinder gas is collected from hooded Gump grinders which are grinding fresh roasted coffee; and this grinder gas is continuously condensed as a frost by means of liquid nitrogen. The grinder gas frost was combined with cottonseed oil in about equal parts by weight and this mixture was centrifuged at 3,200 RPM's for from 5 to 10 minutes in a high-speed refrigerated centrifuge (International Centrifuge, Model B-20). The liquid was observed to separate into oil and water phases. The oil phase was separated and found to have a water level of less than 0.1 percent by weight.

This "dry" oil was found to retain a pleasant fresh roasted coffee aroma without the development of off-notes for a period of at least 1 week when stored at 70°F under an inert atmosphere. Grinder gas which was collected and combined with cottonseed oil in the same manner as set forth above, but which was not processed to remove excess water, is found to have a water level of about 20 percent by weight and develops significant peanutty off-notes after only 5 to 6 hours when stored under comparable conditions.

EXAMPLE 2

Confined volume coffee aroma obtained by steaming roasted and ground coffee in an isolated column was collected and condensed in the manner set forth in Example 1 of commonly-assigned U.S. Pat. No. 3,615,665. The condensate was added to and blended with an equal weight of coconut oil and this blend was centrifuged at 3,200 RPM's for 7 minutes in a high-speed, refrigerated centrifuge (International Centrifuge, Model B-20). The liquid was observed to separate into oil and water phases. The oil phase was separated and found to have a water level of less than 0.1 percent by weight.

Having thus described the invention what is claimed is:

1. A method for producing an aromatized coffee product comprising the steps of:
   a. collecting the grinder gas liberated from roasted coffee beans during grinding,
   b. condensing the collected grinder gas to an aroma-bearing frost by means of a two or three stage condensation procedure, the last stage being maintained at a temperature corresponding to that yielded by liquid nitrogen, maintained at its boiling point
   c. combining the condensed aroma-bearing frost with a liquid glyceride material,
   d. reducing the moisture level of the aromatized liquid glyceride to below about 0.5 percent in order to stabilize the aromatized, glyceride liquid and
   e. combining the low-moisture, aromatized glyceride material with dry soluble coffee solids.

2. The method according to claim 1 wherein the liquid glyceride material is an oil.

3. The method according to claim 2 wherein the low-moisture, aromatized glyceride is sprayed onto the soluble coffee solids.

4. The method according to claim 2 wherein the low-moisture, aromatized glyceride is frozen, comminuted and blended with soluble coffee solids.

* * * * *